United States Patent [19]

Ogasawara et al.

[11] Patent Number: 4,618,038

[45] Date of Patent: Oct. 21, 1986

[54] CONTROL APPARATUS OF AN AUTOMATIC TRANSMISSION WITH A LOCK-UP CLUTCH

[75] Inventors: Tsunehiko Ogasawara, Kariya; Yoshichika Arakawa, Nagoya; Koji Sumiya, Nishio; Yoshikazu Sakaguchi, Anjo, all of Japan

[73] Assignees: Aisin Seiki Kabushiki Kaisha; Aisin Warner Kabushiki Kaisha, both of Aichi, Japan

[21] Appl. No.: 585,127

[22] Filed: Mar. 1, 1984

[30] Foreign Application Priority Data

Mar. 31, 1983 [JP] Japan .................................. 58-56440

[51] Int. Cl.$^4$ ...................... F16H 45/02; F16D 33/16; B60K 41/22
[52] U.S. Cl. ................................. 192/3.29; 192/3.31; 192/3.58
[58] Field of Search ............... 192/0.032, 0.052, 0.076, 192/0.092, 3.28, 3.29, 3.31, 3.33, 3.52, 3.58, 103 F

[56] References Cited

U.S. PATENT DOCUMENTS

| | | | |
|---|---|---|---|
| 3,505,907 | 4/1970 | Fox et al. | 192/3.29 X |
| 3,638,771 | 2/1972 | Chana | 192/3.33 |
| 3,656,371 | 4/1972 | Schaefer | 192/0.052 X |
| 3,688,607 | 9/1972 | Marlow | 192/3.58 X |
| 3,691,872 | 9/1972 | Schaefer et al. | 192/3.29 X |
| 4,431,096 | 2/1984 | Kobayashi et al. | 192/3.31 |
| 4,471,438 | 9/1984 | Futagi et al. | 192/3.31 X |
| 4,512,212 | 4/1985 | Ishikawa | 192/3.31 X |

*Primary Examiner*—Rodney H. Bonck
*Assistant Examiner*—Richard M. Lorence
*Attorney, Agent, or Firm*—Burns, Doane, Swecker and Mathis

[57] ABSTRACT

A control apparatus in an automatic transmission includes first and second shift valves which are independently actuable to define four distinct states corresponding to four speed ranges of the transmission. In the first state, neither valve participates in achieving the first range. In the second state, only the first valve participates in achieving the second range. In the third state, only the second valve participates in achieving the third range. In the fourth state, both valves participate in locking a lock-up clutch by being fluidly interconnected by an interconnecting passage so as to define a signal pressure passage which conducts a signal pressure to a lock-up relay valve to implement a locking of the lock-up clutch.

7 Claims, 3 Drawing Figures

FIG. 2

|   |   | Sol.2 | Sol.1 | C1 | C2 | B1 | B2 | F |
|---|---|---|---|---|---|---|---|---|
|   | P | — | — |   |   |   |   |   |
|   | R | — | — |   | ○ |   | ○ |   |
|   | N | — | — |   |   |   |   |   |
| D | 3rd | — | —/○ | ○ | ○ |   |   |   |
|   | 2nd | ○ | — | ○ |   | ○ |   |   |
|   | 1st | ○ | ○ | ○ |   |   |   | ○ |
| 2 | 3rd | — | — | ○ | ○ |   |   |   |
|   | 2nd | — | — | ○ |   | ○ |   |   |
|   | 1st | — | ○ | ○ |   |   |   | ○ |
| L | 2nd | — | ○ | ○ |   | ○ |   |   |
|   | L | — | — | ○ |   |   | ○ |   |

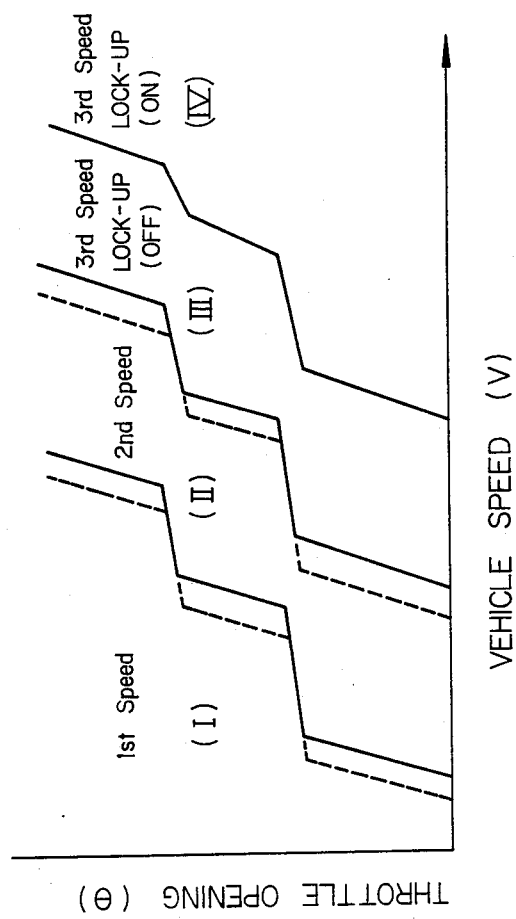

CONTROL APPARATUS OF AN AUTOMATIC TRANSMISSION WITH A LOCK-UP CLUTCH

FIELD OF THE INVENTION

The present invention relates to a control apparatus of an automatic transmission with a lock-up clutch. In more detail, the invention relates to a lock-up control apparatus of a lock-up or direct coupling clutch of an automatic transmission which has a torque converter with a lock-up clutch.

BACKGROUND OF THE INVENTION

The lock-up control of the automatic transmission aims at reducing a power loss by the torque converter at a high speed time by engaging the lock-up clutch in response to a vehicle speed, a depressed amount of an accelerator and the like at a predetermined shift range (in general, at a high speed range, for example, at the third speed,) so that an engine output shaft is directly coupled to an input shaft of the transmission mechanism without transmitting through the torque converter. Conventional lock-up control apparatus comprises a solenoid valve which is used exclusively for the lock-up control in addition to shift valves for the transmission mechanism. As the consequence, the constitution of the apparatus becomes complicated and the number of solenoid valves increases, also resulting in a high manufacturing cost of the apparatus. In connection with these points, there is much desired to be improved in the apparatus.

SUMMARY OF THE DISCLOSURE

Accordingly, the primary object of the present invention is to provide a novel lock-up control apparatus capable of overcoming the above mentioned problems in the prior art.

It is an object of the present invention to provide a control apparatus of an automatic transmission with a lock-up clutch which provides at least three speed ranges and lock-up engaging/disengaging ranges at the highest speed range with a minimum number of shift valves and solenoid valves.

Other objects will become apparent in the entire disclosure.

According to the present invention there is provided:

a control apparatus of an automatic transmission with a lock-up clutch comprising:

a first solenoid valve and a second solenoid valve which exhibit at least four opened and closed states corresponding to four ranges including at least three shift ranges of the first, second and third speeds and lock-up clutch engaging and disengaging ranges at the third speed, a first shift valve which is hydraulically controlled by the first solenoid valve and takes no part in achieving the third speed, and a second shift valve which is hydraulically controlled by the second solenoid valve and takes part in achieving the third speed, wherein the control apparatus further comprises:

passages independent of each other connecting said first and second shift valves to a hydraulic fluid pressure source, and a signal pressure line for engaging and disengaging the lock-up clutch communicatable with the pressure source via the first and second shift valves and a passage therebetween while the second valve is in a position exhibiting the third speed.

In the arrangement as mentioned above, the first solenoid valve and the second solenoid valve are controlled in such a way that their solenoids are energized by an apparatus which detects, for example, the throttle opening and vehicle speed to compare them with the above mentioned predetermined four ranges. For example, the first and second solenoid valves are opened at the first speed range, the first solenoid valve is closed and the second solenoid valve is opened at the second speed range, the first and second solenoid valves are closed at the non-lock-up third speed range, and the first solenoid valve is opened and the second solenoid valve is closed at the lock-up third speed range. The third speed shift range is kept by a servo mechanism of the transmission by the second shift valve irrespective of the lock-up. If conditions fall in the lock-up range, the first shift valve is switched so that a signal pressure line for engaging and disengaging the lock-up clutch is brought into communication with the pressure source via the first and second shift valves and a passage therebetween. A signal pressure is introduced to a lock-up relay valve via the signal pressure line to effect the lock-up.

In the lock-up control apparatus in accordance with the present invention as mentioned above, since the first solenoid valve for the first shift valve functions also as the solenoid valve exclusively used for controlling the lock-up in the prior art, it becomes unnecessary to provide the solenoid valve which is used exclusively for the lock-up as is done in the prior art. As the result, the lock-up control apparatus is simplified, so that the space is saved and the cost is lowered.

In the following the present invention will be disclosed with reference to the drawings presenting preferred embodiments, which, however, serves to better illustrate the invention without limiting it. Modifications apparent in the art may be made without departing from the concept and scope as disclosed and claimed.

BRIEF DESCRIPTION OF THE DRAWINGS

FIG. 2 is a graph showing the opening and closing of a first solenoid valve and a second solenoid valve shown in FIG. 1, the engagement and disengagement of clutches and brakes in a transmission mechanism and shift ranges, and FIG. 3 is a graph showing a relationship of the ranges which correspond to the opening and closing of the first and second solenoid valves with the vehicle speed and the throttle opening.

DETAILED DESCRIPTION OF THE PREFERRED EMBODIMENTS

Figure 1:
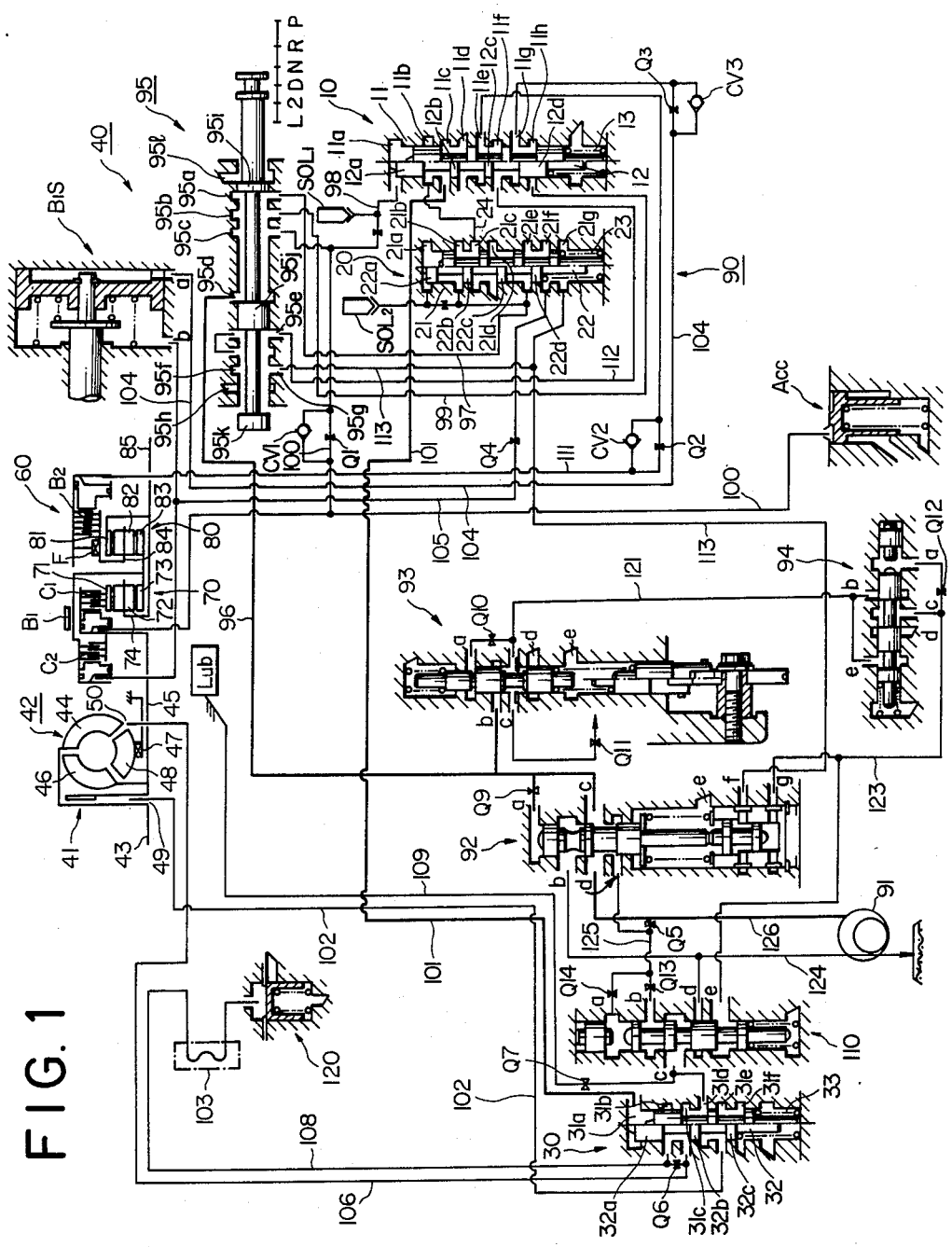
FIG. 1 is a block diagram showing an automatic transmission in which is used a lock-up control apparatus in accordance with the present invention.

Referring to the accompanying drawings, an explanation will be given in respect of one embodiment of a control apparatus of an automatic transmission with a lock-up clutch in accordance with the present invention. The automatic transmission in which is used the apparatus in accordance with the present invention will now be explained with reference to FIG. 1.

An automatic transmission 40 which is shown in FIG. 1 comprises a torque converter 42 which is provided with a lock-up clutch 41, a transmission mechanism 60 which is provided with various kinds of frictional engaging elements, that is, clutches $C_1$, $C_2$, F ( one way clutch ) and brakes $B_1$, $B_2$ and a fluid pressure control apparatus 90 for hydraulically controlling the above mentioned clutches $C_1$, $C_2$, F and brakes $B_1$, $B_2$ and the like.

The torque converter 42 per se is a well known one. And this torque converter 42 comprises a pump impeller 44 which is connected to an engine output shaft 43, a turbine runner 46 which is connected to a driven shaft 45 ( that is, an input shaft of a transmission mechanism 60 ) and a stator impeller 48 which is connected to a housing via a one-way clutch 47. There is provided a lock-up clutch 41 between the input shaft 43 and the output shaft 45. The working fluid in the torque converter 42 usually flows from a port 49 to a port 50. However, if the direction of the flow of the working fluid is reversed, that is, if the fluid flows from the port 50 to the port 49, the lock-up clutch 41 engages so that the input shaft 43 is directly coupled (lock-up) to the output shaft 45.

The transmission mechanism 60 comprises a pair of planetary gear sets 70 and 80 and friction engaging elements, i.e., the clutches $C_1$, $C_2$, the brakes $B_1$, $B_2$ and the one-way clutch F, those friction engaging elements selectively engaging and disengaging members, i.e., gears and pinion carriers thereof. The input shaft 45 of this transmission mechanism 60 is connected via the forward clutch $C_1$ and the direct and reverse clutch $C_2$ to a ring gear 71 of the first planetary gear set 70 and sun gears 73, 83 of the first and second planetary gear sets 70, 80 respectively, and an output shaft 85 is connected to a carrier 74 of a pinion gear 72 of the first planetary gear set 70 and a ring gear 81 of the second planetary gear set 80. A pinion gear 82 and a carrier 84 of the second planetary gear set 80 can be engaged with and disengaged from the housing of the transmission mechanism 60 through the one-way clutch F and the reverse brake $B_2$. The outside drums of the clutch $C_2$, that is, the sun gears 73, 83 of the first and second planetary gear sets 70, 80 can be engaged with (locked to) the housing by the second brake $B_2$ ( There is shown a servo mechanism $B_1S$ at the upper right position in FIG. 1. ). The engagement and disengagement of the above mentioned clutches $C_1$, $C_2$, F and brakes $B_1$, $B_2$ is controlled by the hydraulic fluid pressure control apparatus 90 which will be described hereinafter, to effect the selection of the shift ranges as shown in FIG. 2 together with the energized control of the first solenoid valve $SOL_1$ and the second solenoid valve $SOL_2$. In FIG. 2, the symbol circle indicates the engaged state or the energized state. The solenoid valves $SOL_1$ and $SOL_2$ open when their solenoids are energized.

The hydraulic fluid pressure control apparatus 90 mainly comprises a hydraulic fluid pressure pump 91 for generating hydraulic fluid pressure, a regulator valve 92 for controlling the discharging pressure of the hydraulic fluid pressure pump, a throttle valve 93 for generating a throttle pressure (signal pressure corresponding to the throttle opening) in response to an accelerator pedal (not shown), a modulator valve 94 which controls the regulator valve 92 by the throttle pressure, a manual shift valve 95 (provided with lands $95i$-$95k$ and ports $95a$-$95h$) which is moved by a gear shift lever (not shown) and switches the hydraulic fluid pressure circuit which corresponds to each range, a first shift valve 10 and a second shift valve 20 which are controlled to be opened and closed by the first solenoid valve $SOL_1$ and the second solenoid valve $SOL_2$, respectively, and a lock-up relay valve 30 which switches the supply direction of the working fluid of the torque converter 42. The lock-up control apparatus of the present invention comprises the first and second solenoid valves $SOL_1$, $SOL_2$, the first and second shift valves 10, 20 and the lock-up relay valve 30 as mentioned above.

The first shift valve 10 includes a spool 12 which is slidably disposed in a valve hole having ports $11a$-$11h$. This spool 12 having lands $12a$-$12d$ is biased upwards by a spring 13. The second shift valve is also likewise constituted. That is, the second shift valve includes a spool 22 which is slidably disposed in a valve hole having ports $21a$-$21g$. And the spool 22 having lands $22a$-$22d$ is biased upwards by a spring 23. The lock-up relay valve 30 includes a spool 32 which is slidably disposed in a valve hole having ports $31a$-$31f$. The spool 32 having lands $32a$-$32c$ is biased upwards by a spring 33. The port $11b$ of the first shift valve 10 is communicated with the port $21c$ of the second shift valve 20 via a passage 24.

And the hydraulic fluid pressure control apparatus 90 is further constituted as follows.

(1) The port d of the regulator valve 92 communicates with the port b of a valve 110 through a fluid passage 125. The fluid passage 125 communicates with the fluid passage 126 via an orifice $Q_5$. The port c of the valve 110 communicates with the port $31d$ of the valve 30 and with a lubrication required portion Lub through the fluid passage 109 and an orifice $Q_7$.

(2) When the signal hydraulic fluid pressure is not applied to the port $31a$ of the lock-up relay valve 30, the port $31d$ communicates with the port $31e$, so that the hydraulic fluid which has been suitably adjusted by the valve 110 flows through the fluid passages 102, 49, 50 and the fluid passage 106 to the port $31c$. The fluid then flows from the port $31c$ to an escape valve 120 via the port $31b$, the fluid passage 108, a cooler 103 so that it is drained from the escape valve 120 into a fluid reservoir. At this time, the lock-up clutch 41 is disengaged (in the torque-transmitting state).

(3) When the signal fluid pressure is applied to the port $31a$ of the lock-up relay valve 30, the port $31d$ communicates with the port $31c$, so that the hydraulic fluid (which has been suitably adjusted by the valve 110) flows through the fluid passages 106, 50, 49, the fluid passage 102 to the port $31e$. The fluid then flows from the port $31e$ via the port $31f$ to be drained into the fluid reservoir. At this time, the lock-up clutch 41 is engaged ( in the torque transmitting state ). And one portion of the hydraulic fluid (which has been suitably adjusted by the valve 110) flows from the port $31c$ via an orifice $Q_6$, the fluid passage 108 and the cooler 103 to the escape valve 120, from which the fluid is drained into the fluid reservoir.

(4) A part of the hydraulic fluid (which has been suitably adjusted by the valve 110 ) from the port c of the valve 110 is constantly introduced via the orifice $Q_7$ through the fluid passage 109 into the lubrication required portion Lub.

(5) If the spool of the manual shift valve 95 is in the position "N", the land $95j$ closes the port $95d$ and the ports $95a$-$95g$ other than the port $95d$ communicate with the port $95h$, so that the fluid is not sent into the fluid passages 97, 113, 112, 99, 98 but the hydraulic fluid is drained into the fluid reservoir.

(6) If the spool of the manual shift valve 95 is in the position "R", the land $95j$ opens the port $95d$, so that the port $95d$ communicates with the ports $95e$-$g$ and the land 95k cuts off the communication between the port 95h (in the left end of the spool) and the port 95g. As the consequence, the hydraulic fluid is sent into the fluid passages 112, 113. The hydraulic fluid flows through the fluid passage 113 to the valve 92 and is then introduced from the port f of the valve 92 into a pressure increasing chamber, and the valve 92 functions to increase the fluid pressure to higher pressure. At the same time, the hydraulic fluid is sent to the port 21g of the second shift valve 20 and introduced from the port 21f through an orifice $Q_4$, the fluid passage 105, the clutch $C_2$ to the port b of the servo mechanism $B_1S$.

On the other hand, the hydraulic fluid flows through the fluid passage 112 to the first shift valve 10 and is introduced from the port 11f of the first shift valve 10 via the port 11e by way of an orifice $Q_2$, the fluid passage 111 to the brake $B_2$, thereby establishing a gear train for a reverse range.

(7) When the spool of the manual shift valve 95 is in the position "P", the land 95k causes the port 95g to communicate with the port 95h, and the hydraulic fluid which has been introduced to the port b of the servo mechanism $B_1S$ as well as the clutch $C_2$ and the hydraulic fluid which has been introduced from the port f of the valve 92 to the pressure increasing chamber flow through the ports 21g and 21f of the second shift valve 20, to the fluid passage 113, from which it is drained into the fluid reservoir. The hydraulic fluid is introduced to the brake $B_2$.

(8) If the spool of the manual shift valve 95 is shifted to the position "2" from the D position shown in the drawing, the land 95i causes the port 95a to communicate with the port 95e, so that the hydraulic fluid is drained through the fluid passage 97 into the fluid reservoir. Therefore, if the hydraulic fluid in the port 21a of the second shift valve 20 is drained and the spool 22 is in the upper position ( the left position shown in the drawing ), the hydraulic fluid which has been introduced to the port b of the servo mechanism $B_1S$ as well as the clutch $C_2$ flows through the fluid passage 105, the orifice $Q_4$, the port 21f of the second shift valve 20, the port 21g to the fluid passage 113, from which the fluid is drained into the fluid reservoir. At this time, the hydraulic fluid which has been introduced from the port 21c of the second shift valve 20 to the port 11b of the first shift valve 10 is drained from the port 21d of the second shift valve 20 into the fluid reservoir, thereby establishing the gear train of the forward 2nd speed.

(9) If the spool of the manual shift valve 95 is in the position "L", the land 95i causes the port 95b to communicate with the port 95l, so that the land 95j closes the port 95f and the port 95d communicates with the port 95e. As the consequence, the hydraulic fluid in the fluid passage 99 is drained into the fluid reservoir and the hydraulic fluid is introduced into the fluid passage 112. Therefore, if the spool 12 is in an upper position (the left position shown in the drawing ), the hydraulic fluid which has been introduced to the port a of the servo mechanism $B_1S$ flows through the fluid passage 104, an orifice $Q_3$ and a check valve $CV_3$, the port 11g of the first shift valve 10, the port 11h, the fluid passage 99 to the port 95b of the manual shift valve 95 and is drained from the port 95b of the valve 95 via the port 95h into the fluid reservoir. On the other hand, the hydraulic fluid is introduced from the fluid passage 112 through the ports f and e of the first shift valve 10, an orifice $Q_2$, and the fluid passage 111 to the brake $B_2$, thereby establishing a gear train for the forward 1st speed.

(10) Since the hydraulic fluid is not introduced to the port 11b of the first shift valve 10 in the above paragraphs (5)–(9), the signal fluid pressure is not sent to the fluid passage 101. Therefore, the lock-up clutch is not engaged and actuated.

Now, the operation of the apparatus will be explained.

If the manual shift valve 95 is in the D positon and the vehicle speed and the throttle opening fall in the (I) range as shown in FIG. 3, the solenoids of the first and second solenoid valves $SOL_1$, $SOL_2$ are both energized so that the first and second solenoid valves are opened. On the other hand, the pump 91 and the regulator valve 92 are adjusted so that the line pressure is introduced through the line 96 to the manual shift valve 95. Although the line pressure is supplied via the output ports 95a and 95c of the manual shift valve 95 to the lines 97, 98, the pressure is not introduced to the input ports 11a and 21a of the first and second shift valves 10 and 20 because the solenoid valves $SOL_1$, $SOL_2$ are both opened, the spools 12, 22 of both the valves 10, 20 are in an upper position. At this time, the line pressure $P_L$ which is applied from the port 95b of the manual shift valve 95 via the line 99 to the port 11h of the first shift valve 10 is blocked by the land 12d. On the other hand, since the pressure is introduced to the second clutch $C_2$ independently of the first and second shift valves 10, 20 via the line 100 from the port 95c of the manual shift valve 95, the clutch $C_1$ is engaged and the one-way clutch F functions to brake, thereby achieving the engagement and disengagement of the clutches and brakes as shown in FIG. 2 to achieve the 1st speed. At this time, the pressure which is applied to the port 21b of the second shift valve 20 is blocked by the land 22b, so that it is not developed as an output from the port 21c.

As the result, the line pressure is not applied via the ports 11b, 11c of the first shift valve 10 to the line 101 and the spool 32 of the lock-up relay valve 30 is positioned in the upper position by the spring 33. Hence, the working fluid flows through the line 102, the port 49 of the torque converter 41, the port 50 and the cooler 103, so that the lock-up does not work.

Then, if the vehicle speed and throttle opening vary to fall in the 2nd speed range (II) as shown in FIG. 3, the solenoid of the first solenoid valve $SOL_1$ is deenergized so that the first solenoid valve $SOL_1$ is closed. As the consequence, the pressure is applied to the port 11a of the first shift valve 10 so that the spool 12 moves downward. The pressure is applied via the ports 11h, 11g and the line 104 to the servo mechanism of the second brake $B_1$ so as to obtain the 2nd speed range as shown in FIG. 2. At this time, although the port 31a of the lock-up relay valve 30, the line 101, the ports 11c, 11b of the first shift valve 10 and the port 21c of the second shift valve 20 communicate with one another, the hydraulic pressure therein is exhaused from the manual shift valve 95. As the result, the spool 32 of the lock-up relay valve 30 is in an upper position, so that the lock-up does not work.

Then, if the vehicle speed and the throttle opening enter into the 3rd speed range (III) as shown in FIG. 3 in this state, the solenoids of the first and second solenoid valves $SOL_1$ and $SOL_2$ are both deenergized, so that the first solenoid valve $SOL_1$ is closed. As the result, since the pressure is applied to the ports 11a and 21a, the spools 12 and 22 move downwards, so that the line pressure $P_L$ which is applied from the port 95a of the manual shift valve 95 via the line 97 to the port 21c of the second shift valve 20 is introduced to the draining side of the servo mechanism of the second brake $B_1$ and the direct clutch $C_2$ through the port 21f and the line 105 without flowing through the first shift valve 10. As the result, the clutch $C_2$ is engaged and the brake $B_1$ is disengaged, thereby achieving the 3rd speed shift range as shown in FIG. 2. At this time, since the line pressure which is applied via the ports 21b, 21c of the second shift valve 20 to the port 11b of the first shift valve 10 is blocked by the land 12a, the pressure is not applied via the port 11b and the line 101 to the lock-up relay valve 30. That is, the lock-up does not work.

Now, if the vehicle speed and the throttle opening fall in the range ( IV in FIG. 3 ) which is suitable for the lock-up at the above mentioned 3rd speed, the solenoid of the first solenoid valve $SOL_1$ is energized so that the first solenoid valve $SOL_1$ is opened. And the spool 12 of the first shift valve 10 moves upwards and the spool 22 of the second shift valve 20 is still positioned in a lower position. Therefore, although the engaging and disengaging state of the clutches and brakes of the transmission 60 is not changed, the line pressure $P_L$ is introduced through the ports 21b, 21c of the second shift valve 20, the passage 24, the ports 11b, 11c of the first shift valve 10 and the line 101 to the port 31a of the lock-up relay valve 30. As the result, the spool 32 of the valve 30 moves downwards, so that the port 31d communicates with the port 31c and therefore, the working fluid flows through the line 106, the port 50 of the torque converter 42 to the port 49. As the consequence, the lock-up clutch 41 engages to achieve the lock-up at the 3rd speed.

As described hereinbefore, it is possible to carry out the lock-up control only by the pair of solenoid valves $SOL_1$, $SOL_2$ in accordance with the present invention, thereby making it unnecessary to provide a solenoid valve exclusively for the lock-up. As the result, the reliability is enhanced, the cost is lowered and the space is saved.

In the embodiment, the concept of the 1st–3rd speeds has been used for the convenience of the description and practical value. However, as a matter of course, it is possible to provide additional shift ranges above and below these 1st–3rd speeds. In this case, it is possible to use the present invention as one part of the multi-stage shift ranges.

What is claimed is:

1. A control apparatus in an automatic transmission which defines four speed ranges and includes a fluid pressure source and a lock-up clutch which is lockable in response to a signal pressure to establish the fourth range, said lock-up clutch being lockable solely in the fourth range, said control apparatus comprising:
   first and second solenoid valves,
   first and second shift valves operably connected to said first and second solenoid valves, respectively, to be shifted thereby into opened and closed conditions,
   separate fluid supply passages connecting said fluid pressure source to said first and second shift valves, respectively, and
   an interconnecting passage interconnecting said first and second shift valves,
   said first and second solenoid valves being independently actuatable such that said first and second shift valves together define four distinct states corresponding to said four ranges, respectively,
   said second shift valve being hydraulically operably connected to said transmission in the third of said four states to shift said transmission from said second range to said third range while said first shift valve is hydraulically operably disconnected from said transmission,
   said first and second shift valves being interconnected by said interconnecting passage to conduct a fluid flow therebetween in the fourth of said four states such that said first and second shift valves and said interconnecting passage define a signal pressure passage connected to said pressure source for conducting said signal pressure to establish said fourth range.

2. A control apparatus according to claim 1, wherein said first and second shift valves are both hydraulically operably disconnected from said transmission in said first state wherein said first range is established, and said first shift valve being hydraulically operably connected to said transmission in said second state to shift said transmission from said first range to said second range while said second shift valve is hydraulically operably disconnected from said transmission.

3. A control apparatus according to claim 1, including a working pressure passage interconnecting said pressure source and said lock-up clutch, said working pressure passage including a lock-up relay valve for opening and closing said working pressure passage, said signal pressure passage communicating with said lock-up relay valve for conducting said signal pressure thereto for opening said lock-up relay to admit working pressure to lock said lock-up clutch.

4. A control apparatus according to claim 3, wherein in said fourth range said first shift valve includes a first port connected to said pressure source and a second port connected to said interconnecting passage, said second shift valve includes a first port connected to said interconnecting passage and a second port connected to said lock-up relay valve.

5. A control apparatus according to claim 4, wherein said first and second shift valves are positioned to conduct a fluid flow through said interconnecting passage solely in said fourth state.

6. A control apparatus according to claim 4, wherein said first shift valve includes a drain port for draining said signal pressure line when said transmission is shifted out of said fourth range.

7. A control apparatus according to claim 1, wherein said second shift valve comprises a spool valve having a set of ports for communicating said pressure source with said transmission in said third state.

* * * * *